Figure 1:
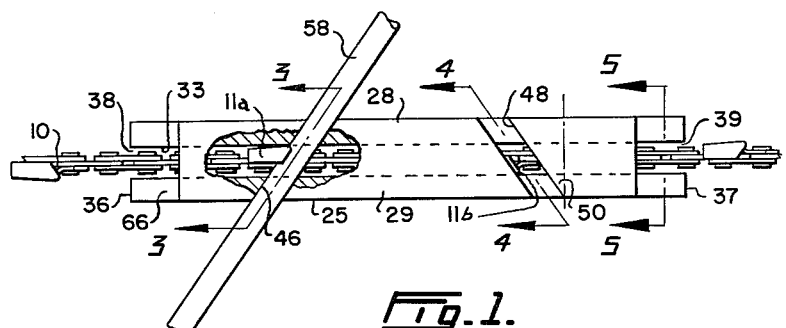

May 28, 1963

J. H. MAIER 3,091,136

SAW CHAIN FILING GAUGE

Filed Aug. 16, 1960

INVENTOR
JOHN H. MAIER

BY
Featherstonhaugh & Co.
ATTORNEYS

United States Patent Office 3,091,136
Patented May 28, 1963

3,091,136
SAW CHAIN FILING GAUGE
John H. Maier, 2636 SW. Marine Drive, Vancouver,
British Columbia, Canada
Filed Aug. 16, 1960, Ser. No. 49,994
2 Claims. (Cl. 76—36)

This invention relates to a gauge to be used when filing a saw chain.

An object of the present invention is the provision of a filing gauge for saw chains which is preset so that both skilled and unskilled filers and chain saw users can operate it, and which cannot go out of adjustment.

Another object is the provision of a simple combination filing gauge and jointing gauge for saw chains.

A further object is the provision of a filing gauge which is small and light in weight so that it is easily carried in a man's pocket, and is inexpensive.

Yet another object is the provision of a filing gauge which permits a saw chain to be filed from opposite sides as the gauge is moved along the chain or the chain is moved through the gauge, whereby one trip around the chain results in a complete filing thereof and, if desired, the jointing of the chain.

There are numerous devices on the market which act as gauges for the filing of saw chains. However, the known devices for this purpose are comparatively complicated and expensive, require a certain degree of skill for operation, can be incorrectly used, and are too cumbersome to be carried around by a chain saw operator, particularly one who is working in the woods. A saw used in the woods for cutting down trees, bucking and limbing is usually in almost constant use and, therefore, requires frequent sharpening. This filing gauge is such that a man can carry it in his pocket so that no matter where he is, he can file and joint his saw.

A saw chain filing gauge according to the present invention includes a block having a passage extending longitudinally of the block and opening out from the bottom and the ends thereof. This passage is deep enough to accommodate therein the cutter teeth and depth gauges of a saw chain. This passage is wide enough to permit relative movement of the chain and gauge, that is, the block may be moved along the chain or the chain through the block passage. Where it is stated herein that the chain moves through the block passage, it is intended to include movement of the block along the chain. The block passage has an inner surface substantially parallel with the block bottom and along which the outer ends of the cutter teeth move as the chain travels through the passage. A transverse channel extends across the block and the passage thereof, and is positioned to hold a file in the proper position to sharpen a cutter tooth of the chain when said tooth is moved along the passage into said transverse channel.

Although the gauge block may have only one transverse channel extending thereacross, it is preferred to provide two transverse channels, each extending angularly across the block, and the angle of one channel being opposite that of the other channel. As is well known, saw chains have right and left cutter teeth. This two-channel arrangement makes it possible to file both the right and left cutters with one trip around the chain.

If desired, the gauge block may be formed with at least one notch in the top thereof and extending down to the longitudinal passage. The notch has a bottom opposed to the block passage. The notch bottom is spaced from the passage bottom a distance equal to the correct vertical distance, or the joining, between the outer ends of the cutter teeth and the outer ends of the depth gauges of the chain. With this arrangement, when a file is reciprocated along the bottom of the notch, the outer end of a depth gauge may be filed properly to joint the chain.

The gauge block may be made of any suitable material. It is preferably formed at least at the transverse channels to resist wear resulting from the movement of files through the channels. The block is preferably made of iron which has been case-hardened, particularly at the transverse channels. However, as the gauge is very simple and inexpensive, it may be made of other materials, such as tough plastic, which will stand up to the filing for a certain time, or it may include re-inforcing inserts at the channels.

Figure 2:
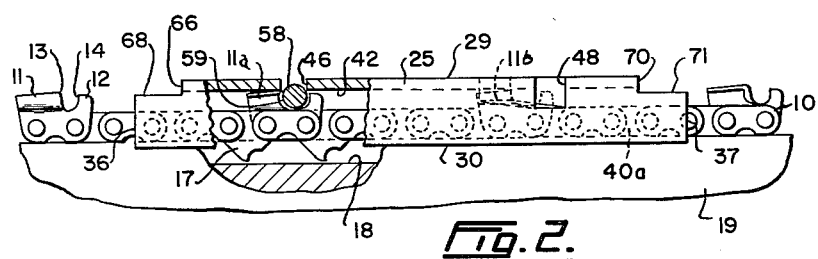
Figure 3:
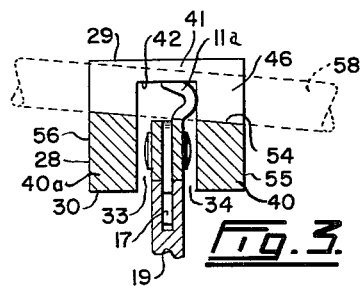
Figure 5:
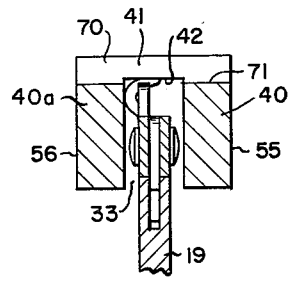
Figure 4:
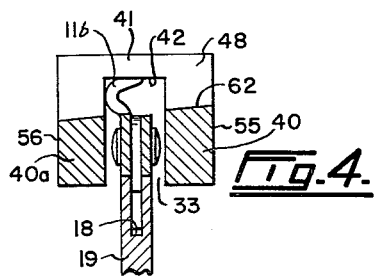

A preferred form of the invention is illustrated in the accompanying drawings, in which, FIGURE 1 is a plan view of a saw chain filing gauge resting on a saw chain, FIGURE 2 is a side elevation, partly in section, of the gauge on the chain, FIGURE 3 is an angular section taken on the line 3—3 of FIGURE 1, FIGURE 4 is another angular section taken on the line 4—4 of FIGURE 1, and FIGURE 5 is a cross section taken on the line 5—5 of FIGURE 1.

Referring to the drawings, 10 is a standard saw chain having cutter teeth 11 and depth gauges 12. The distance between the outer end 13 of cutter 11 and the outer end 14 of gauge 12 represents the joint of the chain. This chain includes lugs 17 that ride in a peripheral groove 18 of a cutter bar 18 when the chain is in use.

A filing gauge 25 constructed according to the present invention is shown mounted on chain 10 ready for a filing operation. Gauge 25 includes a block 28 formed of suitable material, said block having a top 29 and bottom 30. A comparatively large passage 33 extends longitudinally of the block and opens out at 34 from the bottom 30 thereof. The longitudinal passage also opens out from ends 36 and 37 of the block at 38 and 39 respectively. Block 28 actually is U-shaped in cross section, as clearly seen in FIGURES 3, 4 and 5, and passage 33 extends between side walls 40 and 40a depending from a cover 41. Passage 33 is deep enough to accommodate the cutter teeth 11 and depth gauges 12 of the chain, and said passage is wide enough to permit the chain to move therethrough, as clearly seen in FIGURES 3 to 5.

Passage 33 has an inner surface 42 which is substantially parallel with the block bottom 30, and along which the outer ends of the cutter teeth 11 move as the chain travels through passage 33. In other words, cover 41 rides on the cutter teeth. FIGURES 2 to 4 clearly show how the outer ends of the cutters move along the passage surface 42. When gauge 25 is on chain 10, it is actually resting on the outer ends of the cutter teeth thereof.

At least one transverse channel extends across block 28 and passage 33. In this example, transverse channels 46 and 48 extend across the top 29 and passage 33 of the block. Each of the chanels 46 and 48 extends across the block at a filing angle which is such that when a cylindrical file is placed in said chanel, it is in the proper position to sharpen a cutter tooth within the longitudinal passage. The angle of each channel is such as to permit the gauge to be used with one or more different types of saw chains. To accommodate the chain most commonly used today, the angle of each channel 46 and 48 is approximately 35° to a plane normal to longitudinal passage 33. The angle referred to is indicated at 50 relative to channel 48. It will be noted that channels 46 and 48 are opposite to each other so that they may be used for filing left and right cutters of the chain.

Channel 46 has a bottom 54 formed in side walls 40 and 40a opposed to passage bottom 42 and inclined slightly towards said passage bottom from side 55 to side 56 of block 28. When a cylindrical file 58 is placed in channel 46 and rests on bottom 54 thereof, it is in proper position for filing cutter 11a which has been moved along passage 33 into channel 46. The file under cuts the forward edge 59 of the tooth at the correct transverse angle (the angle of the channel) and the correct horizontal angle (the angle of channel bottom 54). Cutter 11a of chain 10 is a left cutter and so channel 46 is for left cutters when gauge 25 is placed as shown on chain 10. Channel 48 is for right cutters, such as cutter 11b. Channel 48 also has a bottom 62 opposed to passage bottom 42 and inclined slightly towards said passage bottom from side 56 to side 55 a block 28, see FIGURE 4. Channel 48 is used in the same manner as channel 46, but for the right cutters 11b.

From the above it will be seen that as gauge 25 is moved along chain 10, or the latter moved through the gauge, the left and right cutters may be filed by means of file 48 operating in channels 46 and 48 respectively. As the file just slidably fits in these channels and rests on the bottoms thereof, it is retained in proper position for filing the teeth, the outer ends of which bear against passage bottom 42. There is nothing to get out of adjustment so that a person does not need any filing skill or experience to use this gauge in sharpening a chain.

It is desirable to provide gauge 25 with means for permitting the joining of chain 10, that is, for filing the ends of gauges 14 to the correct position relative to the outer ends 13 of their respective cutters. To this end, a notch 66 is formed in the top 29 of gauge block 28, preferably near or at one end thereof. This notch also extends across longitudinal passage 33, as clearly shown in FIGURE 5. The notch has a bottom 68 opposed to passage bottom 42 and spaced therefrom a distance equal to the correct vertical distance between the outer ends 13 and 14 of the cutter teeth 11 and gauges 12. When a gauge is moved along passage 33 into notch 66, a file moved across the bottom 68 of the notch will file the end 14 of the gauge, if said end is too high relative to the outer end 13 of its cutter.

Although only one jointing notch 66 may be provided in block 28, another jointing notch 70 may also be provided. The notch 70 may be at the opposite end of the block from notch 66, as shown. Notch 70 has a bottom 71 which extends across passage 33 and is a little lower relative to block top 29 than bottom 68 of notch 66. This provides for two different jointing depths, either of which may be used for chain 10. The notch bottoms may be such that the chain may be jointed for either fine or coarse cutting.

When a person is going to use gauge 25, if it includes notches 66 and 70, he decides which notch he is going to use for the chain to be sharpened and jointed. He then moves the chain through passage 33. As each depth gauge 14 moves into the selected notch, he files the outer end of the gauge if it is too high. As each left cutter enters channel 46 and each right cutter enters channel 48, he sharpens the respective cutters by moving file 58 through the appropriate channel. Thus, it is only necessary to move the complete chain once through passage 33. Another advantage of this gauge is that the chain does not need to be taken off the cutter bar 19 for sharpening and jointing.

What I claim as my invention is:

1. A saw chain filing gauge comprising a block having a passage extending longitudinally of the block and opening out from the bottom and the ends thereof, said passage being deep and wide enough to accommodate the cutter teeth and depth gauges of a saw chain and to permit movement thereof therethrough, said passage having an inner surface along which the outer ends of the cutter teeth move as said teeth travel through the passage, a pair of spaced transverse guide channels formed in and extending across the block and the passage thereof at filing angles and angled towards each other, each transverse channel being positioned to hold a file in the proper position to sharpen a cutter tooth of the chain when said tooth is moved along the passage into the transverse channel, and a notch formed in the top of the block and the longitudinal passage near an end thereof and having a bottom spaced from and opposed to the passage bottom, said notch bottom being spaced from the passage bottom a distance equal to the correct vertical distance between the outer ends of the cutter teeth and the outer ends of the depth gauges of the chain, whereby a file may be reciprocated along the bottom of the notch to file the end of a depth gauge at said notch.

2. A saw chain filing gauge comprising a block U-shaped in cross section to form a longitudinal unobstructed passage extending therethrough between side walls depending from a cover, said passage being deep and wide enough to accommodate the cutter teeth and depth gauges of a saw chain and to permit movement thereof therebetween with said cover resting on and riding over said cutter teeth, said block being supported solely by said cutter teeth, a transverse angularly-arranged guide channel formed in the side walls and cover and extending across the block passage at a filing angle, said channel having a bottom formed in the side walls, said channel being adapted to hold a file extending along the channel bottom in the proper position to sharpen a cutter tooth of the chain when said tooth is moved along the passage into the transverse channel and said cover rests on the latter tooth, and a notch formed in the side walls and cover and having a bottom opposed to the cover, said notch bottom being spaced from the cover a distance equal to the correct vertical distance between the outer ends of the cutter teeth and the outer ends of the depth gauges of the chain, whereby a file may be reciprocated along the bottom of the notch to file the end of a depth gauge at said notch.

References Cited in the file of this patent
UNITED STATES PATENTS

| | | |
|---|---|---|
| 2,705,376 | Cox | Apr. 5, 1955 |
| 2,770,985 | Pearce | Nov. 20, 1956 |
| 2,822,707 | Gommel | Feb. 11, 1958 |
| 2,871,728 | Tremblay | Feb. 3, 1959 |
| 2,898,689 | Mills | Aug. 11, 1959 |
| 2,898,782 | Consoletti | Aug. 11, 1959 |